UNITED STATES PATENT OFFICE.

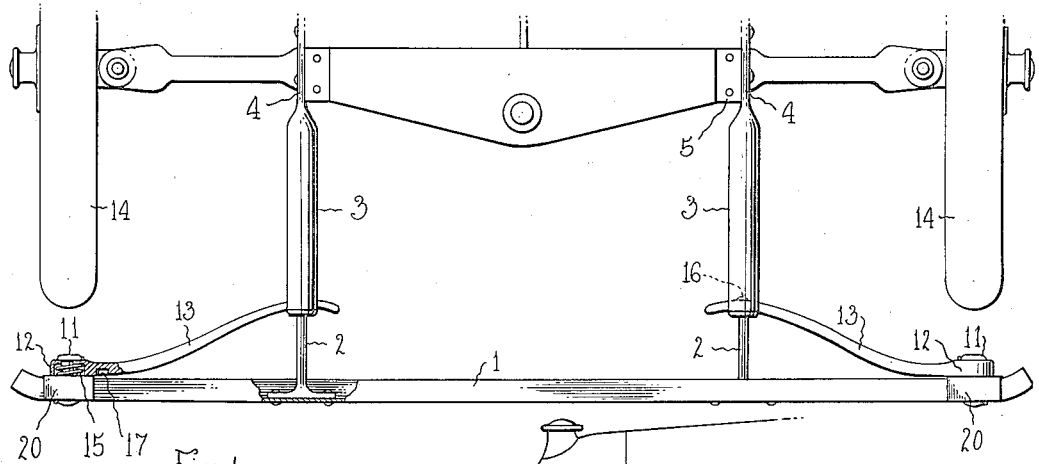
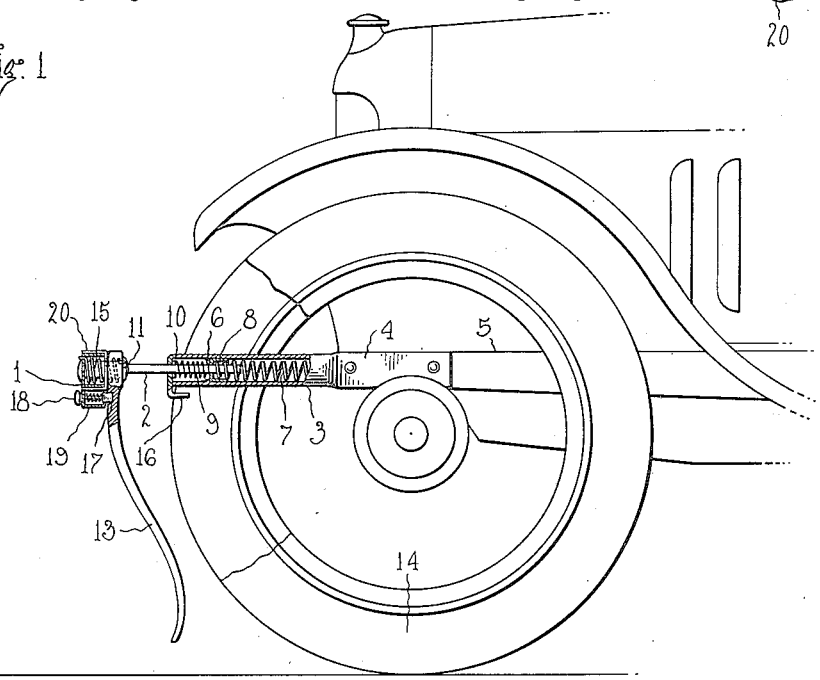
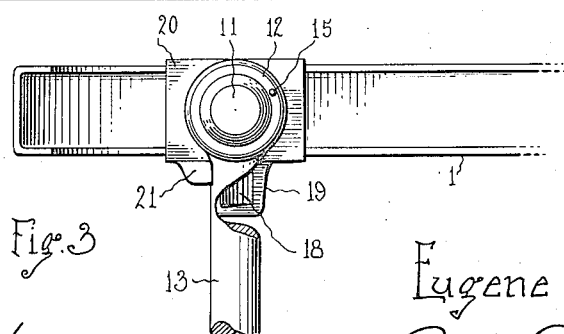

EUGENE MARINKA, OF DETROIT, MICHIGAN.

AUTOMOBILE GUARD AND FENDER.

1,214,049.            Specification of Letters Patent.      Patented Jan. 30, 1917.

Application filed October 21, 1916. Serial No. 126,836.

*To all whom it may concern:*

Be it known that I, EUGENE MARINKA, a subject of the King of Hungary, residing at Detroit, in the county of Wayne and State of Michigan, have invented certain new and useful Improvements in Automobile Guards and Fenders, of which the following is a specification, reference being had therein to the accompanying drawings.

This invention relates to wheel guards, and the primary object of my invention is to combine wheel guards and a yieldable bumper bar as a protecting device that may be advantageously used in connection with motor trucks, touring cars and other vehicles to prevent pedestrians and animals from being run over by an automobile equipped with the protecting device.

Another object of my invention is to furnish a yieldable bumper bar with wheel guards which are maintained normally in inactive position and automatically released by an initial movement of the bumper bar, to swing into active position in front of the wheels of an automobile, to serve functionally as fenders that will cast a body to one side or carry the body forward, thus preventing the body from being run over by the wheels of the automobile.

A further object of the invention is to provide a protecting device for automobiles wherein the parts are constructed with a view of reducing the cost of manufacture and at the same time retain the features by which durability, simplicity of construction, and ease of assembling are secured.

With such ends in view, my invention resides in the novel construction, combination and arrangement of parts to be hereinafter specifically described and then claimed.

Reference will now be had to the drawing, wherein—

Figure 1 is a plan of a portion of an automobile provided with wheel guards and showing the guards in inactive position; Fig. 2 is a side elevation of the same, partly broken away and partly in section, showing one of the guards in an active position; and Fig. 3 is a rear elevation of a portion of the bumper bar provided with a wheel guard.

In describing my invention by aid of the views above referred to, I desire to point out that the same are intended as merely illustrative of an example whereby my invention is put in practice, and I do not care to confine myself to the precise construction and arrangement of parts shown. The following description is therefore broadly construed as including such substitute constructions and arrangements of parts which are the obvious equivalents of those to be hereinafter referred to.

In the drawing, 1 denotes a bumper bar that is preferably channel shaped in cross section, and attached to the inner side of said bar, contiguous to the ends thereof, are plungers 2 extending into cylinders 3. The outer ends of the cylinders 3 are closed except for the openings through which the plungers 2 extend and the inner end of said cylinders terminate in fastener plates 4 adapted to be suitably connected to the sides of an automobile frame 5 or any other support.

The cylinders 3 are provided with inner annular flanges 6 and normally held against said flanges by a large coiled compression spring 7 are cups 8 through which the plungers 2 extend. The large compression springs 7 are housed within the ends of the cylinders 3 and in the outer ends of said cylinders are small compression springs 9. These small compression springs 9 encircle the plungers 2 between the cups 8 and cross heads or pins 10 carried by the plungers 2, said cross heads or pins 10 normally engaging the closed outer ends of the cylinders and limiting the outward movement of the plungers 2 relative to said cylinders. The small compression spring 9 permits of an initial movement of the plungers 2 without compressing or placing under tension the large springs 7, as will hereinafter appear.

Adjacent the outer ends of the bumper bar 1 are bearings 11 for the hollow heads 12 of compound curved wheel guards 13, these guards being of a sufficient length to extend in proximity to the ground and the forward wheels 14 of an automobile. Encircling the bearings 11 within the bumper bar and the hollow heads 12 of the guards 13, are coiled springs 15 having end convolutions thereof connected to the bumper bar and also to the guards 13, so that said guards may be actuated by the retractile force of said spring. The free ends of the wheel guards 13 are adapted to be temporarily held in keepers 16, carried by the outer closed ends of the cylinders 3 and when the wheel guards are in a horizontal position and held by said keepers, the springs 15 are under tension and constitute means for automatically lowering or swinging the wheel guards to vertical position when said guards are released or shifted out of engagement with the keepers 16.

The front side of each wheel guard, adjacent the hollow head thereof, has a notch 17 and adapted to engage in said notch and lock the wheel guard in a lowered or vertical position is a spring pressed detent or latch 18 arranged in a casing 19, carried by a channel strap 20 mounted upon the bumper bar 1, between said bar and the hollow head 12 of the wheel guard. The strap 20 is cut away to provide clearance for the bearing 11 and the spring 15 and the detent or latch may be manually shifted to release the wheel guard, so that the spring 15 may be placed under tension by manually swinging said wheel guard to its normal horizontal inactive position. The casing 19 provides a stop 21 for the wheel guard when swinging to a vertical position, thus correctly positioning the notch 17 to receive the detent 18.

Assuming that a pedestrian is struck by the bumper bar 1, said bar will yield and an initial movement of said bar shifts the free ends of the wheel guards 13 out of engagement with the keepers 16 and permits of the springs 15 swinging the wheel guards downwardly to a vertical position in front of the automobile wheels 14. The wheel guards 13 will be automatically locked in vertical positions and further movement of the bumper bar 1 completely compresses the small springs 9 and causes the cups 8 to shift in the cylinders 3 and place the large spring 7 under tension, said springs cushioning the bumper bar 1 and allowing the same to yield sufficiently to prevent a pedestrian from being seriously injured by contacting with the same. With the wheel guards 13 lowered in front of the automobile wheels, a body that has fallen to the ground in front of the wheels, or even a small animal, is prevented from being run over by the wheels. The guards will either cast the body or animal to one side or drag the body along until the automobile can be brought to a standstill.

The bumper bar 1 or the wheel guards 13 when released of any pressure against the same assumes normal position with the plungers 2 extended and then the wheel guards 13 can be unlocked or released and swung to horizontal inactive position in engagement with the keepers 16.

The protecting device in its entirety is made of light and durable metal finished to harmonize with other metallic fittings of an automobile, and by slight alterations in connection with the inner ends of the cylinders 3, the device may be used in connection with various kinds of vehicles.

What I claim is:—

1. A device of the type described comprising a yieldable bumper bar, spring actuated wheel guards carried by said bumper bar and adapted to be held in inactive positions, and released by an initial movement of said bumper bar to assume active positions in front of the wheels of a vehicle, and means carried by said bumper bar for engagement with said wheel guards to lock said guards in active positions.

2. A device of the type described comprising cylinders adapted for attachment to a vehicle, reciprocable plungers extending into said cylinders, a bumper bar connecting said plungers, spring actuated wheel guards carried by said bumper bar and adapted to be held in horizontal inactive positions by the ends of said cylinders and released by an initial movement of said bumper bar to assume vertical active positions in front of the wheels of a vehicle, and means carried by said bumper bar for engagement with said wheel guards to lock said guards in active positions.

3. The combination with vehicle wheels, of spring actuated guards in front of said vehicle wheels, means yieldably supporting said wheel guards and adapted for holding said guards in an inactive position and capable of releasing said guards to assume active positions, and means carried by said yieldable means adapted for locking said guards in active position.

4. A device of the type described comprising cylinders adapted for attachment to a vehicle, plungers extending into said cylinders, means in said cylinders adapted for cushioning an inward movement of said plungers, means in said cylinders adapted to permit of an initial movement of said plungers independent of said cushioning means, a bumper bar carried by said plungers, wheel guards pivotally held by said bumper bar and adapted to have the ends thereof held at said cylinders to maintain said guards in inactive positions, and means at the pivoted ends of said guards adapted to swing said guards to vertical active positions when released by an initial movement of said plungers.

In testimony whereof I affix my signature in the presence of two witnesses.

EUGENE MARINKA.

Witnesses:
KARL H. BUTLER,
ANNA M. DORR.